United States Patent
Bruls

(10) Patent No.: US 6,174,566 B1
(45) Date of Patent: Jan. 16, 2001

(54) METHOD AND APPARATUS FOR APPLYING A PROTECTIVE FILM OF, FOR EXAMPLE, OIL TO THE INTERIOR OF A METAL PIPE

(75) Inventor: Nicola Jozef Marie Bruls, Haelen (NL)

(73) Assignee: Brubek B.V., Haelen (NL)

( * ) Notice: Under 35 U.S.C. 154(b), the term of this patent shall be extended for 0 days.

(21) Appl. No.: 09/407,067

(22) Filed: Sep. 28, 1999

(30) Foreign Application Priority Data

Sep. 28, 1998 (NL) .................................................. 1010201

(51) Int. Cl.$^7$ ................................ B05D 7/22; B05D 1/02
(52) U.S. Cl. .................... 427/236; 427/235; 427/238; 427/239; 427/327; 427/348; 427/421
(58) Field of Search ................................ 427/230, 236, 427/238, 239, 235, 327, 421, 348; 118/317, DIG. 10

(56) References Cited

U.S. PATENT DOCUMENTS

| 5,207,292 | * | 5/1993 | Pecot et al. ...................... 184/15.1 |
| 5,667,841 | * | 9/1997 | Toyoda et al. .................... 427/235 |
| 5,873,390 | * | 2/1999 | Satake et al. .................... 138/97 |

FOREIGN PATENT DOCUMENTS

| 0353086 | 1/1990 | (EP). |
| 2264240 | 10/1975 | (FR). |
| 2587921 | 4/1987 | (FR). |

* cited by examiner

Primary Examiner—Timothy Meeks
Assistant Examiner—Michael Barr
(74) Attorney, Agent, or Firm—Jacobson, Price, Holman & Stern, PLLC

(57) ABSTRACT

The invention relates to a method and apparatus for applying a protective film of, for example, oil to the interior of a metal pipe for preservation purposes. The method is according to the invention characterized by the steps of placing one end of the pipe to be preserved against a pipe member provided with a spray nozzle, siphoning over a particular amount of oil from a storage vessel into a bent pipe section of said pipe member, and generating and leading a compressed air pulse through the pipe member and the pipe to be preserved by quickly opening and closing a valve which is disposed in said pipe member between said bent pipe section and a pressure vessel which is connected to the other end of said pipe member.

4 Claims, 2 Drawing Sheets

METHOD AND APPARATUS FOR APPLYING A PROTECTIVE FILM OF, FOR EXAMPLE, OIL TO THE INTERIOR OF A METAL PIPE

BACKGROUND OF THE INVENTION

Field of the Invention

The invention relates to a method for applying a protective film of, for example, oil to the interior of a metal pipe for preservation purposes. The invention furthermore relates to apparatus for applying a protective film of, for example, oil to the interior of a metal pipe for preservation purposes, at least comprising a storage vessel for, for example, oil.

Metal pipes are commonly known semi-finished products, which are manufactured in various lengths, wall thicknesses and diameters. In the process industry and in the installation industry, for example, it is very desirable that the interior of such semi-finished pipes are clean and non-corroded. Usually such pipes are provided with a protective film of oil for interim storage and transport to the end user, which oil film, due to its preserving action, prevents corrosion on the inside of the pipe. A known method for applying an oil film to the interior of a metal pipe is to submerge such a pipe in an oil bath. This method requires a great deal of time and space, however, whilst it is furthermore characterized by excessive oil consumption, which burdens the environment, and said method is not very efficient and functional when pipes of considerable length are to be preserved. In addition, said method is not suitable for use with pipes having a small diameter, since the oil cannot penetrate into the pipe sufficiently well upon submersion. Moreover, it is practically impossible to remove the (excess) oil after the treatment.

A prior arrangement consists of moving an oil-soaked wad through the pipe, which wad is connected to a rod which is moved forward and backward through the pipe. Moving the rod with the oil-soaked wad through the pipe is a laborious and time-consuming activity, which makes the apparatus unsuitable for preserving pipes having a considerable length or a small diameter. In addition, there is a risk of the wad remaining behind in the pipe after the treatment and obstructing said pipe, as a result of which the pipe will be unusable.

Further drawbacks of the known methods and apparatus are the fact that they can only be used with straight pipes and that it is difficult to ascertain after each treatment whether the interior of the pipe is fully coated with an oil film.

SUMMARY OF THE INVENTION

The object of the invention is to obviate the above drawbacks and to provide a method and apparatus by means of which the complete interior of metal pipes having a relatively random length, cross-sectional shape and diameter can be coated with an oil film in a quick and efficient manner, using a small amount of oil.

In order to accomplish that objective, the method according to the invention is characterized by the steps of placing one end of the pipe to be preserved against a pipe member, siphoning over a particular amount of oil from an oil storage vessel into a bent pipe section of said pipe member, generating and leading a compressed air pulse through the pipe member and the pipe to be preserved by quickly opening and closing a valve which is disposed in said pipe member between said bent pipe section and a pressure vessel for compressed air which is connected to the other end of said pipe member.

With this method a particular amount of oil proportional to the metal pipe to be preserved is used at all times, as a result of which the oil consumption is kept well in hand and the burden to the environment is reduced to the smallest possible degree. Above all, the invention makes use of the insight that it is possible to obtain an optimum control of the oil distribution over the interior of said metal pipe by quickly opening and closing a valve and leading the compressed air pulse that is thus generated through the pipe. In contrast to the methods and apparatus that have been used at this moment, the entire interior of the pipe is provided with an oil film, as a result of which no impurities can deposit directly on the interior of the pipe and no corrosion will occur.

According to the invention, a further improved preservation is obtained in that the distribution of the film over the interior of the pipe is partially determined by the speed and the duration of opening and closing the valve and by the initial pressure of the compressed air pulse.

The method according to the invention can furthermore be characterized in that, following the step of quickly opening and closing the valve, the compressed air pulse which is led through the pipe is collected, the air is cleared of residual oil, which residual oil is returned to the oil storage vessel. In contrast to the methods which are already known, this leads to a further reduction of the oil consumption, which benefits the environment.

An improved treatment of a pipe can be obtained in that prior to the application of the oil film to the interior of the pipe, the pipe is cleaned by means of a compressed air pulse not containing any oil.

The invention furthermore relates to apparatus for applying a protective film of, for example, oil to the interior of a metal pipe for preservation purposes, which apparatus comprises a storage vessel for, for example, oil. The apparatus is according to the invention characterized in that it comprises a pipe member, which is connected to said oil storage vessel via a pipe, as well as a bent pipe section for containing a particular amount of oil, wherein the pipe to be preserved can be placed on a first end of said pipe member and wherein the other end is connected to a pressure vessel for compressed air, and wherein a valve is disposed in said pipe member between said pressure vessel and said bent pipe section, which valve functions to quickly pass a compressed air pulse for a short period of time. Thus it is possible to preserve metal pipes of relatively random length and diameter in a quick and efficient manner, while using a small amount of oil, by applying a protective oil film to the interior thereof. By opening the valve for a brief period of time, an "explosive" pressure pulse of compressed air through the pipe member is generated, which "shoots" the amount of oil through the metal pipe to be preserved, and a more or less uniform film distribution over the complete interior of the pipe is provided. Thus, the number of pipes to be rejected due to a contaminated and corroded interior is reduced to a minimum.

Preferably, the bent pipe section is a U-shaped or spiral-shaped section or constructed as a siphon.

In another embodiment, the apparatus according to the invention is characterized in that said valve is a quick-acting pneumatic valve, which is preferably actuated by means of an electric pulse. Depending on the valve dimensions, the type of valve and the opening and closing characteristic, the use of such a quick-acting pneumatic valve enables proper control of the final film distribution over the interior of a pipe, which distribution partially depends on the length and the shape of the electrical pulse. The selection, adjustability and actuation of the quick-acting pneumatic valve makes it possible to adapt the preservation treatment completely to metal pipes having a particular length and diameter.

According to another aspect of the invention, the first end of the pipe member is fitted with a spray nozzle.

Thereby, the spray nozzle may extend conically in the direction of its free end. Another embodiment of the invention is characterized in that the bore of the spray nozzle diverges in the direction of the free end of the spray nozzle. These different constructions of the spray nozzle make the apparatus suitable for a wide range of pipe diameters. In addition, such spray nozzles are self-aligning and they also seal the pipe to be preserved.

Another embodiment of the apparatus is according to the invention characterized in that said apparatus is provided near the free end of the pipe to be preserved with means for collecting the compressed air pulse passed through the pipe, clearing said air from residual oil and returning the residual oil to the oil storage vessel. This contributes towards a further reduction of the oil consumption and of the burden to the environment. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention will now be explained in more detail with reference to a drawing, wherein:

DESCRIPTION OF THE INVENTION

Figure 1:
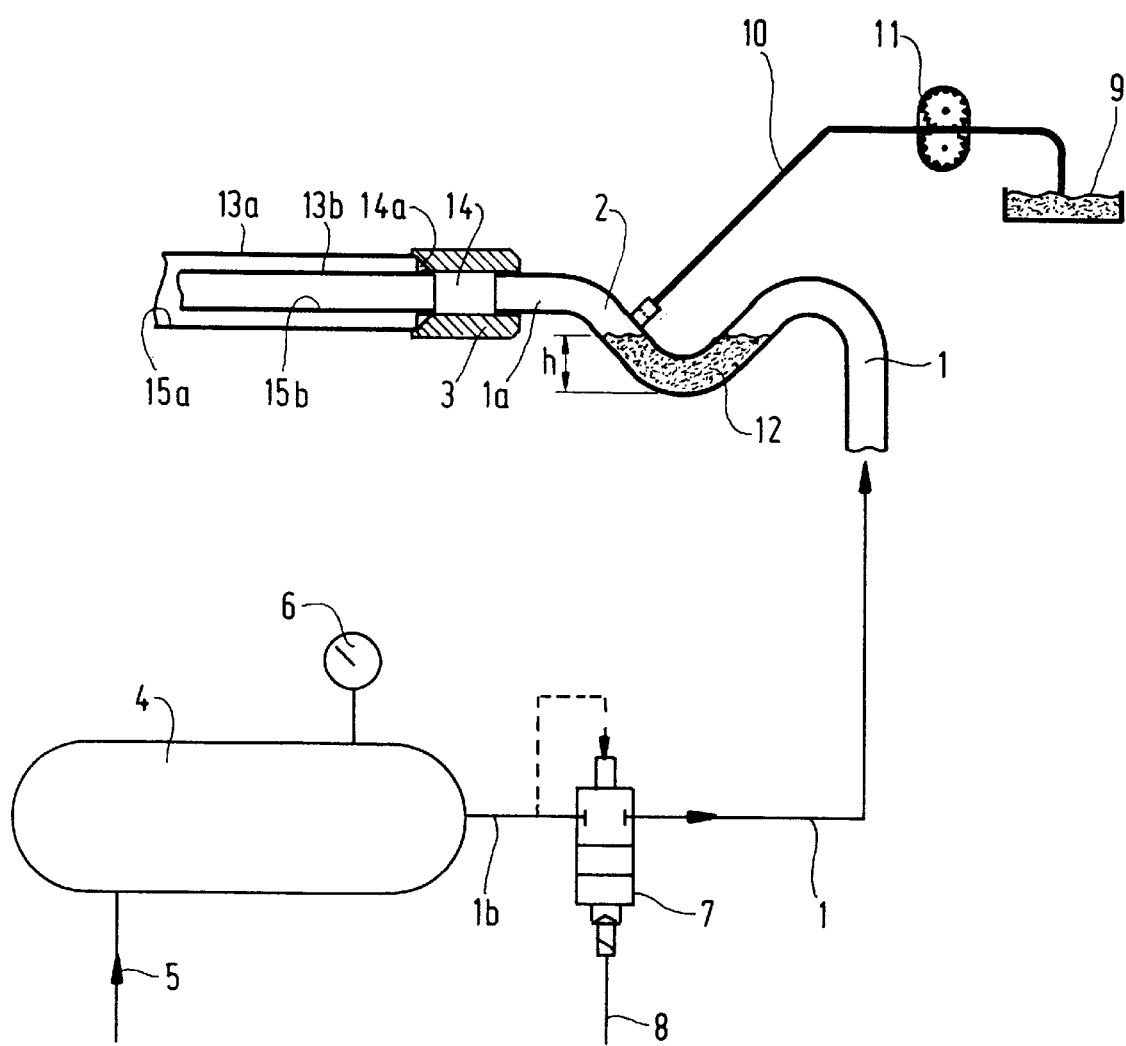
FIG. 1 shows an embodiment of the apparatus according to the invention.

FIG. 1 shows an apparatus according to the invention. The apparatus consists of a pipe member 1, which includes a bent pipe section 2. Pipe 1 is provided at a first end 1a with a spray nozzle 3, and at the other end 1b it is connected to a pressure vessel 4 for compressed air. Pressure vessel 4 can be pressurized via supply line 5 by introducing air into it, for example via a compressor (not shown). The compressed air pressure in the pressure vessel 4 can be varied and adjusted and be read either by means of manometer 6 or automatically. A valve 7 is provided in pipe 1, between pressure vessel 4 and pipe section 2, which is bent to a U-shape. Valve 7 is preferably a quick-acting pneumatic valve, which can be quickly opened and closed again by means of an electric pulse 8. Other valve types are also quite suitable, provided it is possible to open and close the applied valves in a quick manner. The apparatus furthermore comprises an oil storage vessel 9, which is connected to pipe member 1 via a pipe 10. It is possible, using a gear pump 11, to siphon over a particular amount of oil from storage vessel 9 to pipe member 1, where the oil will collect in U-bend 2. This amount of oil is indicated by numeral 12 in the drawing. Besides gear pumps, also other pump types are quite suitable, provided it is possible to dose the amount of oil which is present in pipe member 1 accurately.

Spray nozzle 3 is provided with a bore 14, which diverges near the free end of spray nozzle 3, as is indicated with 14a. The diverging portion 14a of bore 14 makes it possible to accommodate pipes of different diameters (indicated at 13a and 13b) when the pipes are being placed against spray nozzle 3.

A certain amount of oil 12 is present in the U-shaped pipe portion 2 of pipe member 1. By quickly opening and closing valve 7 by means of an electric pulse 8, a compressed air pulse travels from pressure vessel 4 through pipe member 1, which compressed air pulse will "shoot" the amount of oil 12 from spray nozzle 3 into pipe 13a. The short and vehement compressed air pulse causes oil 12 to travel in an almost explosion-like manner through metal pipe 13a, where it adheres to the entire interior 15a.

The electric pulse 8 is delivered by a, preferably programmable, controller (not shown). By varying the shape and the pulse length of the electric pulse 8, valve 7 can be actuated in a randomly adjustable manner, and a compressed air pulse can be generated in the pipe member 1, such that an effective and optimum control of the film distribution over the interior of metal pipe 13a is obtained. Not only does this enable a better control of the oil consumption, but it makes it also possible to treat metal pipes having a considerably greater length or a smaller diameter than previously. The desired preservation treatment, or the final oil film in the interior of a metal pipe, is not only determined by the length, the shape and the diameter of the pipe and the shape and the pulse length of the electric pulse 8 by which valve 7 is actuated, but the result of each preservation treatment is also influenced by the amount of oil 12, the length and the diameter of pipe member 1, the compressed air pressure that prevails in pressure vessel 4, the volume of pressure vessel 4 and the shape and valve characteristic of valve 7. The treatment of a pipe may furthermore be influenced by a suitable selection of the properties of the oil to be used and by the selected dimensions and the length of pipe member 1.

Figure 2A:
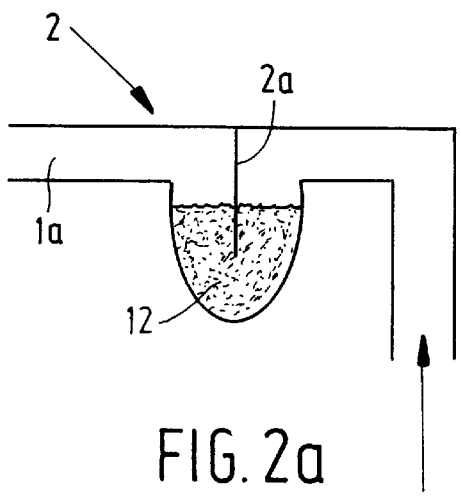
FIGS. 2a–2c and 3a–3c show various embodiments of parts of the apparatus according to FIG. 1.
Figure 2B:
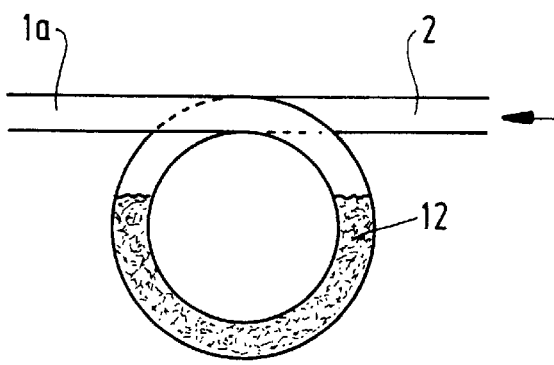
Figure 2C:
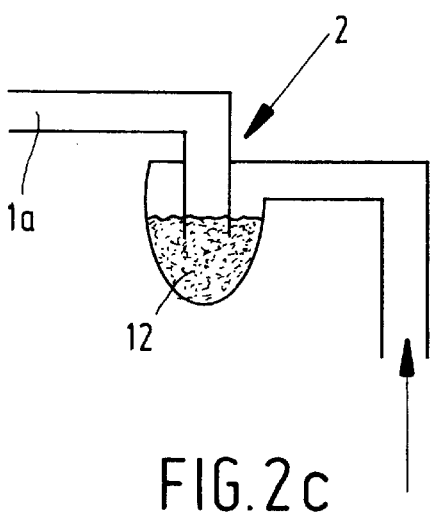

FIGS. 2a, 2b and 2c show possible embodiments of pipe section 2, in which the oil 12 is received. The pipe section may comprise a partition 2a (FIG. 2a) or be spiral-shaped (FIG. 2b), but it may also be in the form of a siphon (FIG. 2c) which is incorporated in pipe member 1.

Figure 3A:
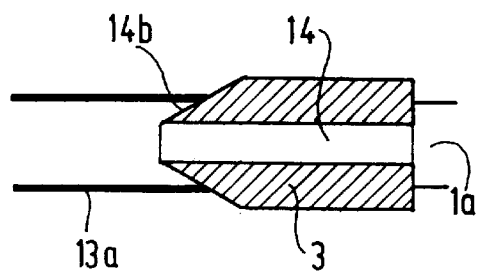
Figure 3B:
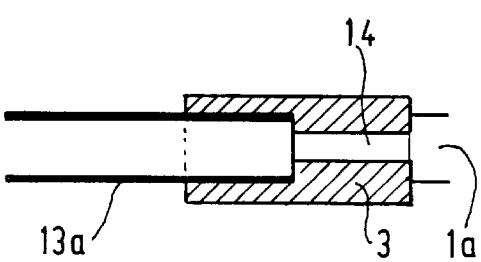
Figure 3C:
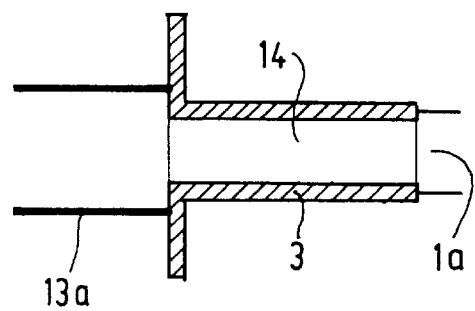

FIGS. 3a, 3b and 3c show alternative embodiments of the spray nozzle. FIG. 3a shows a spray nozzle which extends conically towards free end 14b, which makes it possible to accommodate pipes having a large diameter. FIG. 3b shows a spray nozzle for pipes having a standardized diameter, whilst FIG. 3c shows a spray nozzle having a flat connecting surface, likewise for treating large numbers of standardized pipes.

It will be apparent that the apparatus according to FIG. 1 is not only a highly versatile apparatus, by means of which large numbers of metal pipes having relatively random lengths and cross-sectional shapes can be provided with a protective film on the interior in a quick, efficient and, moreover, environmentally friendly manner, whilst it is furthermore possible, by varying one of more of the above mentioned conditions, to influence the film distribution over the interior of the pipe depending from the pipe and the desired preservation method.

After the oil film has been applied to the pipe, the pipe can be closed by means of a plug at both ends so as to prevent migration of dirt etc. into the pipe during further transport and storage.

The apparatus according to the invention or another apparatus functioning according to the same principle may deliver a "dry" compressed air pulse, that is, without oil, before applying an oil film to the interior of pipe 13, so as to remove all kinds of "dry" impurities, such as sand, leaves, vermin etc. from the pipe to be preserved.

It will be quite obvious that the apparatus is not only capable of treating metal pipes, but that the apparatus is also suitable for treating pipes made of other materials, for example plastic, nonferrous metals and the like. Due to the principle of applying an oil film by means of a pressure pulse, it is possible to treat not only straight pipes, but also bent pipes or pipes having different shapes (for example spiral pipes).

The method and apparatus according to the invention are not only suitable for round pipes, but also for all kinds of hollow bodies having a closed circumference, such as sleeves and the like having relatively random cross-sectional shapes (oval, square, etc.). Furthermore it is possible to treat multiple pipes, that is, pipes built up of several pipe segments. In that case, the spray nozzle must be adapted accordingly to the respective cross-sectional shape of the pipe in order to provide a good connection for transmitting the oil-containing compressed air pulse(s) and to prevent leakage to the outside.

In order to a achieve a further optimization of the treatment process, or in order to treat pipes having special cross-sectional shapes and/or lengths, the treatment can be repeated under identical conditions or under adapted or changed conditions. Possibly, the product to be treated can be treated in successive steps by several apparatuses according to the invention, each having different settings.

The apparatus may include several compressed air supplies 4 connected to pipe 1, which each function under different conditions. This obviates the necessity of readjusting the compressed air supply after every treatment, as is the case when only one compressed air supply 4 is provided.

The possible use of a flexible pipe member 1 results in a more mobile apparatus which is easier to handle, which makes it possible to treat pipes on site or in the course of their production.

In order to further optimize the treatment and reduce the burden to the environment, the pipe may be subjected to one or more "clean" compressed air pulses, without oil, after the oil film has been applied to the pipe, so as to effect a more uniform film distribution in the pipe or to remove, collect and reuse any excess oil. In addition to that, the compressed air as well as the oil may be heated. This makes it possible to obtain with a lesser amount of oil a more uniform distribution of the oil over the interior of the pipe, due to a better flow of the oil through the pipe.

The method and apparatus according to the invention need not be restricted to the use of compressed air depending on the desired treatment, or for safety reasons, also other (inert) gases are quite suitable. Furthermore it is possible to use substances other than oil for treating the interior of a pipe. Even previously applied films, for example coats of paint or other coatings can be removed very effectively, using a solvent, by means of the apparatus according to the invention. The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. A method for applying a protective film of a liquid preservation substance to the interior of a metal tube for preservation purposes, comprising the steps of:

placing one end of the tube to be preserved against a spray nozzle provided on one end of a pipe member, siphoning over a particular amount of said preservation substance from a substance storage vessel into a bent pipe section of said pipe member, through a connection between said storage vessel and said bent pipe section, opening and closing a valve, which is disposed in said pipe member between said bent pipe section and a pressure vessel, which vessel is connected to another end of said pipe member opposite the one end placed against the tube to be preserved, generating and leading a compressed air pulse from said pressure vessel through the pipe member and the tube to be preserved, and distributing an amount of said preservation substance contained in the bent pipe section as a film over the interior of the tube to be preserved.

2. A method according to claim 1, wherein the distribution of the film over the interior of the tube is partially determined by the speed and the duration of opening and closing the valve and by the initial pressure of the compressed air pulse.

3. The method according to claim 1, wherein, following the step of opening and closing the valve, the compressed air pulse which is led through the tube is collected, the air is cleared of residual preservation substance, which residual substance is collected and returned to the storage vessel.

4. The method according to claim 1, wherein prior to or after the application of the protective film to the interior of the tube, the tube is cleaned or the film distribution is corrected by means of a compressed air pulse not containing any preservation substance.

* * * * *